Figure 1:
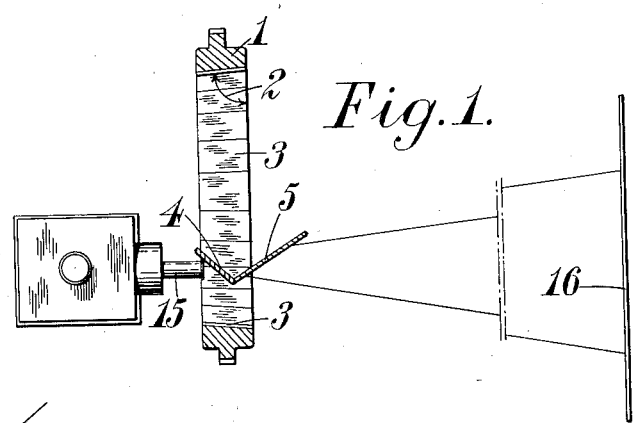

Nov. 20, 1923.

K. HIGGINSON

CINEMATOGRAPHIC APPARATUS

Filed Feb. 2, 1922

1,475,013

Inventor
Kingsley Higginson
by Byrnes Stebbins Burgess Parmelee
his Attorneys

Patented Nov. 20, 1923.

1,475,013

UNITED STATES PATENT OFFICE.

KINGSLEY HIGGINSON, OF LONDON, ENGLAND, ASSIGNOR TO CAREY-GAVEY SYNDICATE LIMITED, OF LONDON, ENGLAND, A BRITISH COMPANY.

CINEMATOGRAPHIC APPARATUS.

Application filed February 2, 1922. Serial No. 533,558.

*To all whom it may concern:*

Be it known that I, KINGSLEY HIGGINSON, a subject of the King of England, residing in London, England, have invented certain new and useful Improvements in Cinematographic Apparatus, of which the following is a specification.

This invention relates to cinematographic apparatus of the type possessing the known characteristics comprising a rotatory mirror of annular form having a plurality of facets on its inner face and supported to rotate about the principal axis of the annulus, and a projector arranged to throw a beam through one open side of the annulus on to the facets so that the beam is reflected thereby to emerge through the other open side of the annulus. In the said type, one or more stationary mirrors may or may not be employed, between the projecting objective and the annular mirror, or between the said mirror and the screen, as providing the immediate surfaces from which and on to which the beam is respectively directed on to and received from the facets of the annulus.

It is obvious that, in this type of apparatus, each facet of the annular mirror receives a movement in relation to the projected beam falling upon it, which movement may be resolved into two distinct elements, namely (1) a movement of translation across the field of light provided by the beam, and (2) a continuous tilting of its plane with reference to the general direction of the beam as movement No. 1 proceeds.

Various methods have been devised for compensating, by means of the said two movements, for the travel of the film, in such a way as to secure a stationary picture upon the screen. The method commonly proposed has been so to arrange the optical system as to produce a virtual image that shall be stationary in space, for example upon the axis of rotation of the mirror or upon an axis parallel thereto and then to project the said image by further suitable optical means upon the screen. By these methods the various necessary corrections are introduced between the film and the said stationary image produced in space.

Several difficulties arise in carrying out the above method and other methods heretofore devised, among which difficulties may be mentioned that of constancy of degree of illumination of the picture on the screen. The object of the present invention is to obviate more or less completely such difficulties.

The present invention resides in the selection of the principal ray and particularly the principal ray of the centre of the picture as that element of the projected beam that is to be so reflected by the annular mirror as to intersect the image plane at a stationary point.

The term "principal ray" is herein employed in its usual signification to denote a ray proceeding from a point in the film through the nodal point of the objective lens and the continuation of that ray as it emerges from the lens. It is obvious that, as a picture on the film traverses the gate, a principal ray, such for example as that from the centre of the picture, pivots about the nodal point in the lens and so sweeps out an angle on either side of the said nodal point, the extent of which angle is subtended at the nodal point by the height of the gate.

This invention therefore provides apparatus so constructed that each facet of the mirror shall, when receiving part or whole of a picture from the film in movement, have (*a*) a movement of translation such that the point on the facet which receives the principal ray from the centre of a picture as the latter traverses the gate does not change, and (*b*) an angular movement of the plane of the facet such as will suffice so to reflect the said ray that it shall always intersect the image-plane (such for example as the screen) at the same point.

The motion (*a*) is simple to realize but the motion (*b*) is less simple and is of an amount comprising two factors or elements, namely one equal to half the afore-mentioned angular sweep of the principal ray, and another superposed upon the first so as to augment it and necessitated by the fact that the first said factor or element will cause the reflected ray to remain parallel to itself and so move down the screen by the height of the facet, in the passage of the picture across the gate, unless corrected for. This said second factor therefore has an angular magnitude equal to that subtended by the height of a facet at a point on the screen. Strictly speaking it is the angle subtended from a point on the screen by the distance traversed by the incident point upon the facet of a single principal ray during the passage of a single picture through the gate, but this either is identical with or approximates so closely to the height of the facet that it is more simply stated as the height of the facet and with sufficient accuracy.

The term "height" is used in every case to denote a measurement in the direction of movement of translation either of the film or of a facet.

The present invention thus provides apparatus of the kind described, so constructed that the angle between successive facets is such that, when two of them are in position to receive the upper and lower halves respectively of two successive pictures each occupying one half of the gate, the principal rays projected from the upper and lower edges of the gate are reflected each by its respective said facet, to intersect one another on the image plane.

Owing to the fact that in the preferred construction at least, the plane of each facet is not normal to the plane of its rotation but is slightly inclined thereto, a disturbing condition arises which may be met by a further correction provided by this invention. The said disturbing condition is hereinafter referred to as the "obliquity of incidence," and this term is further employed herein to denote the angle which the axial ray of the optical system makes with the normal to a facet when the latter is in its mean operative, that is to say reflecting, position.

This invention therefore further provides that, the external angle between successive facets may be made to exceed one half of the angle subtended at the entrant nodal point of the objective lens by the upper and lower edges of the gate, sufficiently to compensate for the "obliquity of incidence" and/or for the convergence required in the reflected rays from the facets owing to the relative nearness thereto of the image plane, whereby the said reflected rays are caused to intersect one another on the said image plane.

According to another feature of the invention there is provided apparatus of the type described wherein the projector is so located relatively to the annulus that the second nodal point of the projecting objective lens is optically distant from the facet of the annulus which receives the projection beam by a length that is substantially half the radius of the annulus.

It will be appreciated that whereas each point of the film in the gate moves with a straight-line motion, each facet of the mirror, on the other hand, moves in a circular path, with the result that only an approximate attainment of the desired result is reached by the construction defined. This arises from the fact that it is based on the supposition that the film is moving in a circular path whereof the radius is one half that of the radius of curvature of the path of the facet, which relation between the curvatures is necessary for the strict fulfilment of condition (b) outlined above. In this connection, as in all the optical conditions herein laid down, it is to be understood that such reasonable approximations to the desired conditions as are commonly employed in the design and construction of optical instruments are provided by, and comprised within, this invention, and the said conditions are not to be held as unfulfilled if they are not rigidly fulfilled, provided such reasonable approximations are in fact secured.

Figure 2:
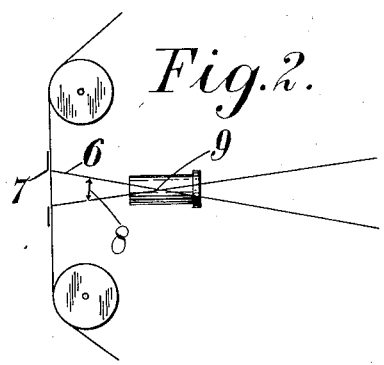
Figure 3:
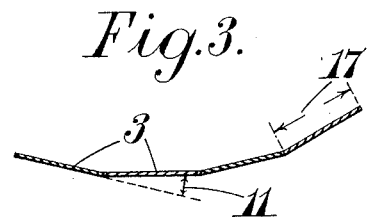
Figure 4:
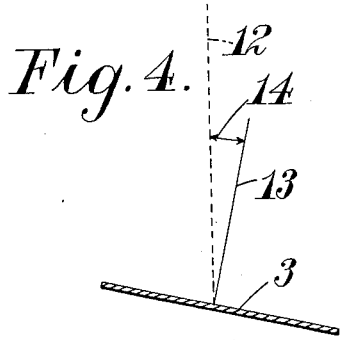

In a construction of apparatus embodying this invention, and here described by way of illustration with reference to the accompanying drawings which are diagrammatic in character, Figure 1 is a general plan view of the apparatus but with the annular mirror shown in section, Figure 2 a diagram to illustrate the annular sweep of a principal ray, and Figures 3 and 4 are diagrams to illustrate the terms "external angle" and "obliquity of incidence."

In this construction, an annular mirror 1 of, say, 64 facets is prepared and having a diameter as measured between two opposed facets, of, say, 1.9 feet. Each facet 3 is of slightly trapezoidal form and the mutually inclined edges of each facet are in contact with their neighbours so that the annulus is in the form of a frustum of an equi-angular pyramid having a basal angle 2 that is about 79¼ degrees. At a distance of about five inches radially inwards from the reflecting surface of the annulus, and within the annulus, is mounted a plane mirror 4 so situated and inclined to the plane of rotation of the mirror as to secure the result that a beam projected from it on to the facet will, when reflected by the latter, just clear the plane mirror. The mean direction of projection on to the facets 3 is parallel to the plane of their rotation: hence the "obliquity of incidence" is 10¼ degrees. The beam may thus be made to enter through that side of the annulus which is of lesser diameter on to the plane mirror and after having been twice reflected emerge through the open side of larger diameter of the annulus. The objective 15 of the projector is brought as close to this plane mirror 4 as is practicable so that the total optical distance between the film in the gate and the facet shall be as small as possible, since it is upon this distance that the necessary diameter of the annulus depends as above defined. It is desirable for obvious reasons to keep this diameter small.

Conveniently, but not necessarily, a second plane mirror 5 is provided to receive the beam reflected from the annulus and reflect it in a direction substantially parallel to the axis of rotation of the annulus.

The parts are so proportioned that each facet is equal in the dimensions between its mutually inclined edges to the section made by it of the pyramidal projection thereon of the aperture of the gate, as defined by the principal rays from the edges of that aperture.

The diagram of Figure 2 shows a principal ray 6 from the centre of a picture passing the gate indicated at 7 and sweeping out the angle 8 in its passage across the gate, this being the angular sweep of a principal ray above referred to: the nodal point of the lens is diagrammatically suggested at the point 9. In Figure 3 a portion of the annular mirror is indicated to show the external angle 11 between two successive facets 3, and in Figure 4 a facet 3 is indicated with reference to the plane of its rotation 12 and the normal 13 to the facet, the angle 14 between the plane 12 and the normal 13 being that which is above referred to as the "obliquity of incidence." The screen is indicated at 16 in Figure 1, and the "height" of a facet at 17 in Figure 3.

What I claim as my invention and desire to secure by Letters Patent is:—

1. In a cinematographic apparatus, an image plane, an annular mirror comprising a series of internal facets adapted to project light rays onto said image plane, means for projecting light rays onto said facets from a continuously moving film to be projected, and means for imparting a movement of translation to said facets, such that the point on the facet which receives a given ray from a picture being projected does not change, and an angular movement sufficient to reflect said ray in such manner that it shall always intersect said image plane at substantially the same point.

2. In a cinematographic apparatus, an image plane, a rotatable annular mirror comprising a series of angularly extending facets adapted to receive light rays and project the same onto said image plane, and means comprising a gate for a continuously moving film and an objective for projecting light rays onto said facets from a film in the gate, the said facets being so disposed that the internal angle made by two successive pictures each occupying one half of the gate, two rays projected respectively through the film at the upper and lower edges of the gate are reflected each by its respective facet to intersect one another at a point on the image plane.

3. In a cinematographic apparatus, an image plane, a rotatable annular mirror comprising a series of angularly arranged facets adapted to receive light rays and project the same onto said image plane, and projecting means comprising a gate for a continuously moving film and an objective lens for projecting light rays onto said facets from a film in the gate, the said facets being so disposed that the external angle between any two successive facets exceeds the angle subtended at the entrant nodal point of the said lens by the opposed edges of the gate by an amount equal to the angle subtended at a point on the screen by the "height" of a facet, and by a further amount proportional to the angle which the axial ray of the said lens makes with the normal to a facet when the latter is in its reflecting position.

4. In a cinematographic apparatus, an image plane, a rotatable annular mirror comprising a series of facets adapted to project light rays onto said image plane, and projecting means comprising a gate for a continuously moving film and an objective lens for projecting light rays onto said facets from a film moving in the gate, said objective lens being so located in relation to the annulus that the second nodal point of the objective lens is optically distant from the facet of the annulus which receives the projected beam by a length that is substantially half the radius of the annulus.

In testimony whereof I affix my signature.

KINGSLEY HIGGINSON.